(12) United States Patent
Wen

(10) Patent No.: US 6,933,975 B2
(45) Date of Patent: Aug. 23, 2005

(54) TDI IMAGER WITH AUTOMATIC SPEED OPTIMIZATION

(75) Inventor: David Wen, Los Altos, CA (US)

(73) Assignee: Fairchild Imaging, Milpitas, CA (US)

( * ) Notice: Subject to any disclaimer, the term of this patent is extended or adjusted under 35 U.S.C. 154(b) by 651 days.

(21) Appl. No.: 10/133,228

(22) Filed: Apr. 26, 2002

(65) Prior Publication Data

US 2004/0135914 A1 Jul. 15, 2004

(51) Int. Cl.[7] .............................................. H04N 5/335
(52) U.S. Cl. ...................... 348/312; 348/311; 348/295
(58) Field of Search ................................ 348/312, 311, 348/294, 252, 207.99; 358/208.1, 3.27, 447, 461, 486, 445, 514

(56) References Cited

U.S. PATENT DOCUMENTS

| | | | |
|---|---|---|---|
| 4,580,894 A | 4/1986 | Wojcik | |
| 4,591,727 A | 5/1986 | Gaebelein et al. | |
| 4,949,172 A | 8/1990 | Hunt et al. | |
| 5,038,215 A | * 8/1991 | Hadfield | ..................... 348/312 |
| 5,101,266 A | 3/1992 | Schlig et al. | |
| 5,703,642 A | 12/1997 | Stevens | |
| 5,848,123 A | 12/1998 | Strömmer | |
| RE36,047 E | 1/1999 | Giblom et al. | |
| 5,894,143 A | 4/1999 | Tanigawa et al. | |
| 6,032,864 A | 3/2000 | Hamasuna | |
| 6,049,351 A | 4/2000 | Noguchi et al. | |
| 6,085,050 A | 7/2000 | Rowe et al. | |
| 6,115,149 A | 9/2000 | Lai et al. | |
| 6,219,463 B1 | 4/2001 | Hyodo | |
| 6,256,056 B1 | 7/2001 | Kunishige et al. | |
| 6,292,594 B1 | 9/2001 | Iwai | |
| 6,337,713 B1 | * 1/2002 | Sato | ........................... 348/312 |
| 2002/0093694 A1 | * 7/2002 | Spears | ......................... 358/514 |
| 2002/0093697 A1 | * 7/2002 | Spears et al. | ................ 358/445 |
| 2002/0130957 A1 | * 9/2002 | Gallagher et al. | ........... 348/294 |

* cited by examiner

Primary Examiner—Aung Moe
(74) Attorney, Agent, or Firm—Townsend and Townsend and Crew LLP

(57) ABSTRACT

An apparatus and a method for synchronizing the velocity of an image of a moving object and the clocking of image sensor elements used to track the moving target. The imaging apparatus includes a two-dimensional array of image sensor elements being configured to sense a first set of image elements in a first direction according to a clock rate. A plurality of rows of image sensor elements are spaced from each other. The rows of image sensor elements are configured to sense a second set of image elements of the target moving in the first direction according to the clock rate. Each row has image sensor elements that are different in length from the image sensor elements of the other rows. A measurement module is coupled with the plurality of rows of image sensor elements to measure the sharpness of detected image elements and to identify the row of image sensor elements having the sharpest detected image elements.

20 Claims, 2 Drawing Sheets

TDI IMAGER WITH AUTOMATIC SPEED OPTIMIZATION

BACKGROUND OF THE INVENTION

The present invention relates to optical imaging and, more particularly, to an apparatus and a method for synchronizing the velocity of an image of a moving object or target and the clocking of image sensor elements used to track the moving target.

A widely used method of electro-optical single-frame imaging involves mechanically sweeping an image past a linear array of photoelements and reading out the array once for each incremental advance of the image. In this way, nearly square frames or long strip-type frames of imagery may be obtained. Certain types of arrays, such as time delay and integrate (TDI) arrays operate the same way, differing primarily in that they collect signals over many line periods.

An early example of utilizing scanned linear imaging arrays is a device having a series of back-to-back silicon diodes in a structure made from two monolithic silicon diode arrays. The array was electronically scanned with the aid of a fixed voltage drop along one of these arrays, together with a voltage sawtooth applied at one terminal. Other types of electronically scanned linear arrays followed, including the use of charge-coupled device (CCD) arrays. The scanning function can be performed in excellent fashion with a simple CCD shift register coupled to the array of photodiodes.

In TDI imaging, each photoelement of the line-scan array is replaced by a light sensing CCD shift register. The TDI imaging CCD arrays are commonly constructed out of a plurality of closely spaced, parallel TDI CCD shift registers built on a photoelectric semiconductor substrate. The array of sensor elements or detectors are used to store an electrical signal representative of the time-integrated radiation intensity. An optical image is scanned across the surface of the photoelectric semiconductor substrate of the TDI imager along the length of the TDI shift registers. The shift registers are clocked in synchronism with the motion of the optical image. Electrons that are freed under one of the TDI shift registers by the photoelectric effect of light in a given portion of the optical image are collected into a charge packet that will be moved along by the TDI shift register in conjunction with that given portion of the optical image. When a charge packet reaches the end of its associated TDI shift register, it is fed into an output CCD shift register in parallel with all of the other charge packets which have reached the end of the their associated TDI shift registers at the same time. The output shift register rapidly shifts out all of the charge packets fed thereto, and provides a series of charge packets or pixel values. The variable charge levels of the series of charge packets correspond to the variable light intensity of a picture line taken from the two-dimensional optical image scanned across the TDI imaging CCD array of the TDI imager.

For a TDI imaging CCD array to function properly without image smearing, the charge packets must be shifted down the shift registers at the same velocity as the image being scanned across the surface of the CCD array.

BRIEF SUMMARY OF THE INVENTION

Embodiments of the present invention are directed to an apparatus and a method for synchronizing the velocity of an image of a moving object or target and the clocking of image sensor elements used to track the moving target. The image of the moving target is projected onto an array of image sensor elements such as a TDI imaging CCD array. The image of the moving target moves in a first direction, and the array of image sensor elements integrate light from the image projected thereon into pixel values, which are shifted along the image sensor elements in the first direction according to a clock rate. The sharpness of the image is automatically detected and a signal is generated to adjust the velocity of the target or the clock rate in the correct direction to achieve improved sharpness. A plurality of linear TDI imaging arrays or CCD shift registers having different electrode pitches are provided. Portions of the image are projected onto the plurality of linear arrays or shift registers, which are clocked by the same clock drivers. The speed at which the image is scanned across each of the shift registers is the same, but the speed at which the signal charge or pixel value is moved along each of the CCD registers is proportional to the length of the CCD electrodes or electrode pitches. By comparing the sharpness of the outputs from the plurality of CCD registers, one can determine which way to adjust either the velocity of the target or the clock rate to optimize the sharpness of the image for the array of image sensor elements.

In accordance with an aspect of the present invention, an imaging apparatus comprises a two-dimensional array of image sensor elements being configured to sense a first set of image elements of a target moving in a first direction with respect to the two-dimensional array of image sensor elements, to integrate light from the set of image elements into corresponding pixel values, and to shift the pixel values along the image sensor elements in the first direction according to a clock rate. A plurality of rows of image sensor elements are spaced from each other and extend in the first direction. The rows of image sensor elements are configured to sense a second set of image elements of the target moving in the first direction, to integrate light from the rows of image sensor elements into corresponding pixel values, and to shift the pixel values along the rows of image sensor elements in the first direction according to the clock rate. The plurality of rows have the same number of image sensor elements. Each row has image sensor elements that are different in length from the image sensor elements of the other rows. A measurement module is coupled with the plurality of rows of image sensor elements to measure the sharpness of detected image elements sensed by the image sensor elements in each row and to identify the row of image sensor elements having the sharpest detected image elements sensed by the image sensor elements.

In some embodiments, the two-dimensional array of image sensor elements comprises a TDI imaging CCD array. The plurality of rows of image sensor elements each comprise a TDI shift register. The image sensor elements in one of the plurality of rows of image sensor elements are equal in length to the image sensor elements of the two-dimensional array. At least three rows of image sensor elements are spaced from each other. The image sensor elements in at least one of the rows are long image sensor elements which are greater in length than the image sensor elements of the two-dimensional array. The image sensor elements in at least one of the rows are short image sensor elements which are smaller in length than the image sensor elements of the two-dimensional array. The long image sensor elements are greater in length than the image sensor elements of the two-dimensional array of image sensor elements by at most about 30%. The short image sensor elements are smaller in length than the image sensor elements of the two-dimensional array of image sensor elements by at most about 30%. The image sensor elements in one of the rows are reference image sensor elements which are equal in length to the image sensor elements of the two-dimensional array.

In specific embodiments, a controller is configured to control either the velocity of the target moving in the first direction or the clock rate of shifting the charge packets along the image sensor elements of the two-dimensional array in the first direction. The controller makes no adjustment if the row of reference image sensor elements have the sharpest detected image elements. The controller increases the velocity of the target or decreases the clock rate if the row of short image sensor elements have the sharpest detected image elements. The controller decreases the velocity of the target or increases the clock rate if the row of long image sensor elements have the sharpest detected image elements. The controller is configured to adjust the velocity of the target or the clock rate by interpolation or extrapolation based on differences in lengths of the sensor elements among the plurality of rows and the sharpness of the detected image elements by the plurality of rows of image sensor elements as sensed by the measurement module.

In some embodiments, the plurality of rows of image sensor elements are closely spaced from each other. The measurement module comprises a plurality of correlation circuits each coupled with one of the plurality of rows of image sensor elements to measure the sharpness of the detected image elements sensed by the image sensor elements in each row. The measurement module comprises a comparison module configured to compare the sharpness measured by the plurality of correlation circuits and identify the row of image sensor elements having the sharpest detected image elements.

In accordance with another aspect of the invention, a method for optical imaging comprises projecting a first portion of an image of a target moving in a first direction onto a two-dimensional array of image sensor elements which are configured to integrate light from the image into corresponding pixel values, and shifting the pixel values along the image sensor elements of the two-dimensional array in the first direction according to a clock rate. Each image sensor element of the two-dimensional array continues to integrate light projected thereon into the pixel value shifted therealong. The method further comprises projecting a second portion of the image of the target moving in the first direction onto a plurality of rows of image sensor elements spaced from each other and extending in the first direction. The plurality of rows have the same number of image sensor elements. Each row has image sensor elements that are different in length from the image sensor elements of the other rows. The pixel values are shifted along the image sensor elements of the plurality of rows in the first direction according to the clock rate. Each image sensor element of the plurality of rows continues to integrate light projected thereon into the pixel value shifted therealong. The method further comprises measuring the sharpness of detected image elements sensed by the image sensor elements in each row of image sensor elements, and identifying the row of image sensor elements having the sharpest detected image elements sensed by the image sensor elements.

In accordance with another aspect of the present invention, an imaging apparatus comprises a CCD array of image sensor elements being configured to generate charge packets from a first set of image elements of a target projected on the image sensor elements of the CCD array and moving in a first direction with respect to the CCD array of image sensor elements, and to shift the charge packets along the image sensor elements in the first direction according to a clock rate. A plurality of CCD shift registers each include a plurality of image sensor elements extending in the first direction to generate charge packets from a second set of image elements of the target projected on the image sensor elements of the CCD shift registers and moving in the first direction, and to shift the charge packets along the image sensor elements in the first direction according to the clock rate. The plurality of CCD shift registers have the same number of image sensor elements. Each CCD shift register has image sensor elements that are different in length from the image sensor elements of the other CCD shift registers. The imaging apparatus further comprises means for measuring the sharpness of detected image elements sensed by the image sensor elements in each CCD shift register, and a controller configured to control either the velocity of the target moving in the first direction or the clock rate of shifting the charge packets along the image sensor elements of the CCD array in the first direction based on the measured sharpness of the detected image elements of the CCD shift registers.

In some embodiments, at least three CCD shift registers are spaced from each other. The image sensor elements in at least one of the CCD shift registers are long image sensor elements which are greater in length than the image sensor elements of the two-dimensional array. The image sensor elements in at least one of the CCD shift registers are short image sensor elements which are smaller in length than the image sensor elements of the two-dimensional array. The image sensor elements in one of the CCD shift registers are reference image sensor elements which are equal in length to the image sensor elements of the two-dimensional array. The controller makes no adjustment if the row of reference image sensor elements have the sharpest detected image elements, increases the velocity of the target or decreases the clock rate if the row of short image sensor elements have the sharpest detected image elements, and decreases the velocity of the target or increases the clock rate if the row of long image sensor elements have the sharpest detected image elements.

DETAILED DESCRIPTION OF THE INVENTION

Figure 1:
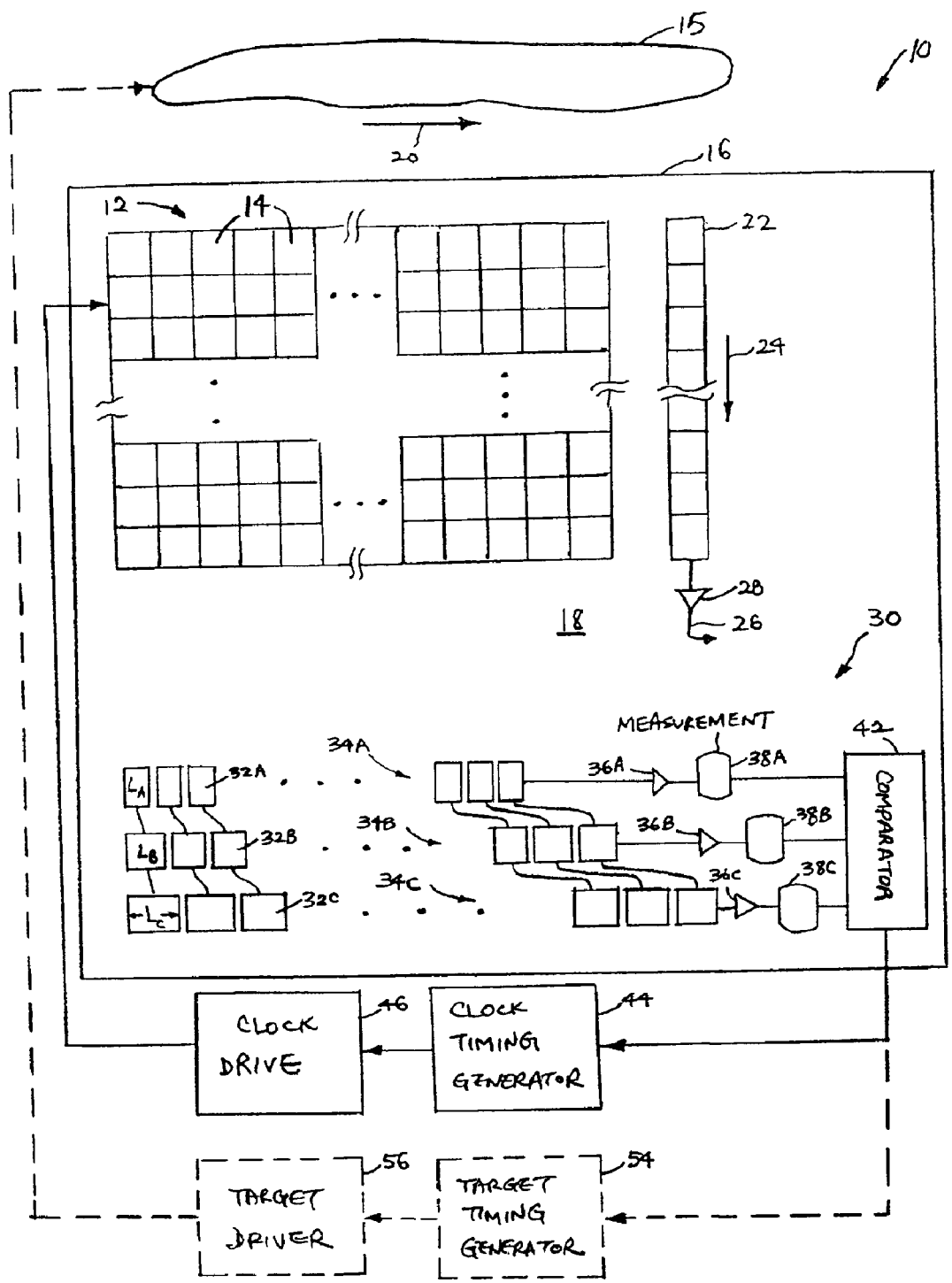
FIG. 1 is a simplified schematic diagram of an imaging apparatus according to an embodiment of the present invention.

FIG. 1 shows an imaging apparatus 10 which includes a two-dimensional array 12 of image sensor elements 14. The array 12 typically may have over a thousand sensor elements 14. Each sensor element 14 produces a charge packet or pixel value, the value of which indicates the intensity of the light in the portion of the image of a target 15 incident upon that element 14. The sensor elements 14 are CCD photosensitive cells, and preferably comprise a plurality of time delay and integrate (TDI) shift registers each composed of a plurality of such cells. In the specific embodiment shown, the array 12 is a time delay and integrate (TDI) imaging CCD array, and the imaging apparatus is referred to as a TDI imager 10. In other embodiments, the array 12 may include sensors that respond to the color or other characteristics of the image.

The array 12 is typically disposed on a substrate such as a semiconductor substrate 16. The array 12 is positioned in the focal plane 18 of an optical image which is focused onto the focal plane 18, for example, in a conventional manner by a lens (not shown), such as the lens of a camera, a scanner, or the like. The sensor elements 14 sense a first set of image elements of the optical image projected onto the imaging apparatus 10. The optical image of the target 15 moves with respect to the array 12 in a direction indicated by the arrow 20, and is scanned across the focal plane or surface 18 of the semiconductor substrate 16 of the imaging apparatus or TDI imager 10 along the length of the main TDI shift registers contained in the main TDI imaging CCD array 12. The main TDI shift registers are clocked to shift the pixel values or charge packets along the main TDI shift registers according to a clocking speed or clock rate, which is ideally in synchronism with the motion of the optical image. Electrons that are freed under one of the main TDI shift registers by the photoelectric effect of light in a given portion of the optical image are collected into a charge packet that will be moved along by the main TDI shift register in conjunction with that given portion of the optical image. The charge packets are moved according to the clock rate along the arrow 20 in what may be referred to as the TDI direction 20.

When a charge packet reaches the end of its associated TDI shift register, it is fed into an output CCD shift register 22 in parallel with all of the other charge packets which have reached the end of the their associated TDI shift registers at the same time. The output shift register 22 is disposed on the substrate 16. The output shift register 22 serially shifts out all of the charge packets fed thereto in the direction indicated by the arrow 24, and provides a series of charge packets or pixel values to an output line 26 which typically includes an amplifier 28. The variable charge levels of the series of charge packets correspond to the variable light intensity of a picture line taken from the two-dimensional optical image of the target 15 scanned across the TDI imaging CCD array 12.

To avoid image smearing in the TDI imager 10, an optimization module 30 is provided to ensure that the charge packets are shifted down the main TDI shift registers of the array 12 at substantially the same velocity as the image of the target 15 being scanned across the surface of the TDI imaging CCD array 12. As shown in FIG. 1, the optimization module 30 includes a plurality of rows of image sensor elements 32 disposed on the focal plane 18 of the substrate 16 extending in the direction of the image movement indicated by the arrow 20 to sense a second set of image elements of the optical image of the target 15 projected onto the imaging apparatus 10. FIG. 1 shows three rows of image sensor elements 32A, 32B, 32C. In this specific embodiment, each row is a linear TDI imaging array or CCD shift register 34A, 34B, 34C, which is clocked to shift the pixel value or signal charge along the register according to the same clock rate used for shifting the charge packets down the main TDI shift registers of the array 12. The registers 34A, 34B, 34C are conveniently disposed on the focal plane 18 of the same substrate 16 as the CCD array 12, and the registers are desirably positioned close to each other. For instance, the registers 34A, 34B, 34C may be generally as closely spaced with each other as the main TDI shift registers in the main TDI array 12. The registers 34A, 34B, 34C are optimization or detection shift registers that are used to automatically detect the sharpness of the image being captured by the imaging apparatus 10 and to generate outputs that can be used to adjust either the velocity of the target or the clock rate in the correct direction to achieve improved sharpness.

The three optimization or detection shift registers 34A, 34B, 34C have the same number of image sensor elements 32A, 32B, 32C as that of the main TDI shift registers of the main array 12, but the image sensor elements 32A, 32B, 32C have different electrode lengths $L_A$, $L_B$, $L_C$ in the TDI direction 20 for shifting. As a result, the three shift registers 34A, 34B, 34C have different electrode pitches. In FIG. 1, the image sensor element 32B has a greater electrode length than the image sensor element 32A ($L_B > L_A$), and the image sensor element 32C has a greater electrode length than the image sensor element 32B ($L_C > L_B$). The electrode lengths are not drawn to scale in FIG. 1, but are exaggerated to illustrate the invention. The speed at which the image is scanned across each of the shift registers 34A, 34B, 34C is the same, but the speed at which the signal charge or pixel value is moved along each of the shift registers 34A, 34B, 34C is proportional to the electrode lengths $L_A$, $L_B$, $L_C$ or electrode pitches. Thus, the first shift register 34A has the lowest pixel value speed, and the third shift register 34C has the highest pixel value speed.

Figure 2:
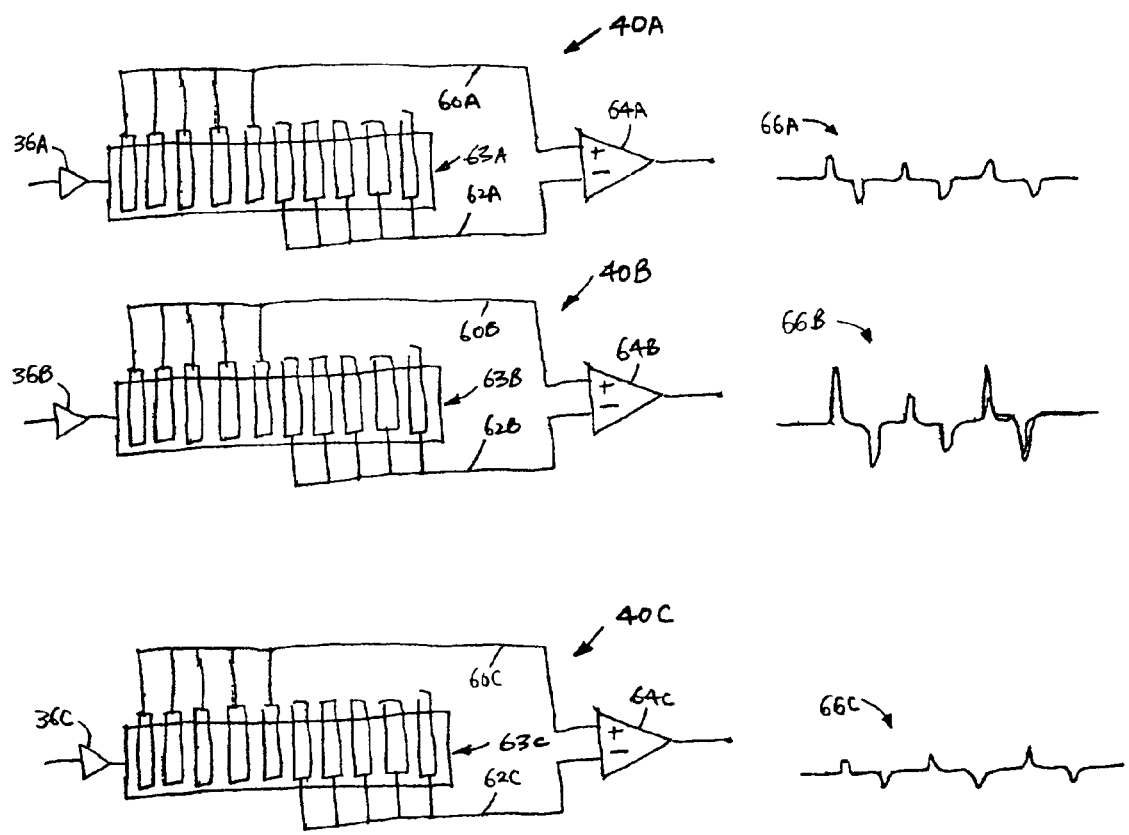
FIG. 2 is a simplified schematic diagram of an image sharpness optimization module in the imaging apparatus of FIG. 1 according to an embodiment of the present invention.

The outputs from the shift registers 34A, 34B, 34C are compared for sharpness of the image detected to determine which way to adjust either the velocity of the target or the clock rate to optimize the sharpness of the image for the array 12 of image sensor elements. As shown in FIG. 1, the output of the first shift register 34A is detected by the first amplifier 36A, and the signal is measured in the first measurement module 38A. The output of the second shift register 34B is detected by the second amplifier 36B, and the signal is measured in the second measurement module 38B. The output of the third shift register 34C is detected by the third amplifier 36C, and the signal is measured in the third measurement module 38C. A variety of suitable measurement modules may be used. One measurement technique employs conventional external circuitry which detects the slopes of the three signals from the three shift registers 34A, 34B, 34C to determine sharpness. Another technique utilizes tapped CCD delay lines or matched filters to measure the sharpness of the signals. Such a technique may be implemented by using correlation circuits 40A, 40B, 40C are illustrated in FIG. 2, for example, which can be designed as part of the overall CCD imaging apparatus 10.

In the specific embodiment shown in FIG. 1, the electrode length $L_B$ of the second image sensor elements 32B is the same as the electrode length of the image sensor elements 14 of the main CCD array 12. If the second shift register 34B detects the sharpest image of the three registers, it indicates that the CCD array 12 has the best synchronization of the clock rate with the velocity of the image as compared to the other two registers 32A, 32C.

If the output of the first shift register 34A shows the sharpest image of the three registers, it indicates that the image scanning speed is too low for the main CCD array 12 (since the lower pixel value speed for the first shift register 34A produces a sharper image than the pixel value speed for the second shift register 34B at the same clock rate). Either the velocity of the target should be increased or the clock rate should be decreased until the output of the second shift register 34B detects the sharpest image.

If the output of the third shift register 34C shows the sharpest image of the three registers, it indicates that the image scanning speed is too high for the CCD array 12 (since the higher pixel value speed for the third shift register 34C produces a sharper image than the pixel value speed for the second shift register 34B at the same clock rate). Either the velocity of the target should be decreased or the clock rate should be increased until the output of the second shift register 34B detects the sharpest image.

As seen in FIG. 1, the outputs of the measurement modules 38A, 38B, 38C are fed to a comparator or comparison module 42 which compares the sharpness measured and identifies the sharpest image. The output of the comparison module 42 is directed to a clock timing generator 44 which adjusts the clock rate of the sensors 14 to achieve the sharpest image. The adjusted clock rate is fed to the clock driver or set of clock drivers 46 for shifting the pixel values in the array 12. Alternatively, the output of the comparison module 42 is fed to a target timing generator 54 which adjusts the velocity of the target moving in the first direction to achieve the sharpest image. The adjusted velocity of the target 15 is fed to the target driver 56 for moving the target 15 in the first direction. As discussed above, no adjustment is made if the second shift register 34B detects the sharpest image. Either the velocity of the target is increased or the clock rate is decreased if the first shift register 34A detects the sharpest image. Either the velocity of the target is decreased or the clock rate is increased if the third shift register 34C detects the sharpest image. The amount of adjustment may be determined by interpolation or extrapolation based on the differences in lengths of the sensor elements 32A, 32B, 32C among the shift registers 34A, 34B, 34C and the measured sharpness results.

FIG. 2 shows correlation circuits 40A, 40B, 40C which receive the outputs of the three shift registers 34A, 34B, 34C from the amplifiers 36A, 36B, 36C of FIG. 1. For each shift register, the pixel values or image elements sensed by the sensor elements 32 are serially shifted out, amplified, and fed into the corresponding correlator or correlation circuit 40 (A–C). Each correlation circuit 40 (A–C) desirably is a CCD circuit which is also disposed on the substrate 16 of the imaging apparatus 10. The correlation circuit 40 (A–C) correlates signals between different sets of taps positioned along a CCD register. For example, FIG. 2 shows a CCD register or delay tapped line 63 (A–C) in each correlation circuit 40 (A–C); each delay tapped line 63 (A–C) has two output lines 60 (A–C), 62 (A–C), which are connected to a differential amplifier 64 (A–C) to generate a correlation signal 66 (A–C).

The signals 66A, 66B, 66C from the three correlation circuits 40A, 40B, 40C are fed into the comparison module 42 of FIG. 1 to determine which has the sharpest image. For instance, the comparison module 42 may compare the various spikes in the signals 66A, 66B, 66C representing sharp transitions in the image (e.g., black-to-white and white-to-black transitions). When a black/white or white/black transition occurs and the transition point is transferred to the middle of the delay line 63 (A–C) tapped between the two output lines 60 (A–C) and 62 (A–C), this tapped delay line 63 (A–C) produces a peak in its signal 66 (A–C). The amplitude of the peak is proportional to the sharpness of the image. Thus, the comparison module 42 may compare the amplitudes of the peaks of the three signals 66A, 66B, 66C to identify the sharpest image. The shift registers 34A, 34B, 34C are desirably close together physically to detect approximately the same region of the image, thereby making the comparison more meaningful. For instance, the registers 34A, 34B, 34C may be generally as closely spaced with each other as the main TDI shift registers in the main TDI array 12. Correlation circuits and comparison modules suitable for this application are known in the art.

The TDI array 12 and the optimization shift registers 34A, 34B, 34C have N stages (number of image sensors in the scan direction 20); while the CCD delay lines 63A, 63B, 63C have M stages. The two numbers M, N need not be equal. Moreover, the optimization shift registers 34A, 34B, 34C may have different numbers of stages in other embodiments. In addition, the output amplifiers 36A, 36B, 36C may be eliminated when the three outputs (charge packets) from the optimization shift registers 34A, 34B, 34C are each fed directly into the corresponding CCD tapped delay lines 63A, 63B, 63C.

In a specific embodiment, the optimization module 30 may be configured to always maintain the output of the second shift register 34B as the sharpest image. The outputs of the first shift register 34A and the second shift register 34C may be degraded by about the same amount, where $L_B-L_A \approx L_C-L_B$. This fine-tuning scheme may be implemented in the comparison module 42 to generate the desired signals to control either the clock timing generator 44 or the target timing generator 54.

The differences in electrode lengths among the shift registers 34A, 34B, 34C may be selected to provide the desired optimization. Typically, the first electrode length $L_A$ and the third electrode length $L_C$ are within about 10–30% of the second electrode length $L_B$, but lengths outside of the range may be used as well depending on the particular application. In addition, the number of optimization shift registers 34 may be different in other embodiments. Although the use of two shift registers 34 can provide some indication of the sharpness of the image for the imaging apparatus 10, a minimum of three shift registers is generally preferred. Because the shift registers 34 do not take up much space, a larger number of shift registers 34 may be used to provide more precise and fine-tuned optimization of the timing of the imaging apparatus 10 to achieve the best sharpness more quickly and accurately.

The optimization scheme for the imaging apparatus is accurate and relatively simple, and the optimization device is relatively easy and inexpensive to build. In a specific embodiments, the TDI imaging CCD array 12, output shift register 22, optimization shift registers 34A, 34B, 34C, and correlation circuits 40A, 40B, 40C are all conveniently formed on a single semiconductor substrate 16.

The above-described arrangements of apparatus and methods are merely illustrative of applications of the principles of this invention and many other embodiments and modifications may be made without departing from the spirit and scope of the invention as defined in the claims. For instance, different ways of measuring the sharpness of the images for the optimization shift registers may be used, and different ways of comparing the images to identify the sharpest image may be employed. The scope of the invention should, therefore, be determined not with reference to the above description, but instead should be determined with reference to the appended claims along with their full scope of equivalents.

What is claimed is:

1. An imaging apparatus comprising:
    a two-dimensional array of image sensor elements being configured to sense a first set of image elements of a target moving in a first direction with respect to the two-dimensional array of image sensor elements, to integrate light from the set of image elements into corresponding pixel values, and to shift the pixel values along the image sensor elements in the first direction according to a clock rate;
    a plurality of rows of image sensor elements spaced from each other, extending in the first direction, and being configured to sense a second set of image elements of the target moving in the first direction, to integrate light from the rows of image sensor elements into corresponding pixel values, and to shift the pixel values along the rows of image sensor elements in the first direction according to the clock rate, the plurality of rows having the same number of image sensor elements, each row having image sensor elements that are different in length from the image sensor elements of the other rows; and a measurement module coupled with the plurality of rows of image sensor elements to measure the sharpness of detected image elements sensed by the image sensor elements in each row and to identify the row of image sensor elements having the sharpest detected image elements sensed by the image sensor elements.

2. The imaging apparatus of claim 1 wherein the two-dimensional array of image sensor elements comprises a TDI imaging CCD array.

3. The imaging apparatus of claim 1 wherein the plurality of rows of image sensor elements each comprise a TDI shift register.

4. The imaging apparatus of claim 1 wherein the image sensor elements in one of the plurality of rows of image sensor elements are equal in length to the image sensor elements of the two-dimensional array.

5. The imaging apparatus of claim 1 comprising at least three rows of image sensor elements spaced from each other, wherein the image sensor elements in at least one of the rows are long image sensor elements which are greater in length than the image sensor elements of the two-dimensional array, and wherein the image sensor elements in at least one of the rows are short image sensor elements which are smaller in length than the image sensor elements of the two-dimensional array.

6. The imaging apparatus of claim 5 wherein the long image sensor elements are greater in length than the image sensor elements of the two-dimensional array of image sensor elements by at most about 30%, and wherein the short image sensor elements are smaller in length than the image sensor elements of the two-dimensional array of image sensor elements by at most about 30%.

7. The imaging apparatus of claim 5 wherein the image sensor elements in one of the rows are reference image sensor elements which are equal in length to the image sensor elements of the two-dimensional array.

8. The imaging apparatus of claim 7 further comprising a controller configured to control either the velocity of the target moving in the first direction or the clock rate of shifting the charge packets along the image sensor elements of the two-dimensional array in the first direction, wherein the controller makes no adjustment if the row of reference image sensor elements have the sharpest detected image elements, wherein the controller increases the velocity of the target or decreases the clock rate if the row of short image sensor elements have the sharpest detected image elements, and wherein the controller decreases the velocity of the target or increases the clock rate if the row of long image sensor elements have the sharpest detected image elements.

9. The imaging apparatus of claim 8 wherein the controller is configured to adjust the velocity of the target or the clock rate by interpolation or extrapolation based on differences in lengths of the sensor elements among the plurality of rows and the sharpness of the detected image elements by the plurality of rows of image sensor elements as sensed by the measurement module.

10. The imaging apparatus of claim 1 wherein the plurality of rows of image sensor elements are closely spaced from each other.

11. The imaging apparatus of claim 1 wherein the measurement module comprises a plurality of correlation circuits each coupled with one of the plurality of rows of image sensor elements to measure the sharpness of the detected image elements sensed by the image sensor elements in each row.

12. The imaging apparatus of claim 11 wherein the measurement module comprises a comparison module configured to compare the sharpness measured by the plurality of correlation circuits and identify the row of image sensor elements having the sharpest detected image elements.

13. A method for optical imaging, comprising:

projecting a first portion of an image of a target moving in a first direction onto a two-dimensional array of image sensor elements which are configured to integrate light from the image into corresponding pixel values;

shifting the pixel values along the image sensor elements of the two-dimensional array in the first direction according to a clock rate, each image sensor element of the two-dimensional array continuing to integrate light projected thereon into the pixel value shifted therealong;

projecting a second portion of the image of the target moving in the first direction onto a plurality of rows of image sensor elements spaced from each other and extending in the first direction, the plurality of rows having the same number of image sensor elements, each row having image sensor elements that are different in length from the image sensor elements of the other rows;

shifting the pixel values along the image sensor elements of the plurality of rows in the first direction according to the clock rate, each image sensor element of the plurality of rows continuing to integrate light projected thereon into the pixel value shifted therealong;

measuring the sharpness of detected image elements sensed by the image sensor elements in each row of image sensor elements; and identifying the row of image sensor elements having the sharpest detected image elements sensed by the image sensor elements.

14. The method of claim 13 wherein at least three rows of image sensor elements are spaced from each other, wherein the image sensor elements in at least one of the rows are long image sensor elements which are greater in length than the image sensor elements of the two-dimensional array, wherein the image sensor elements in at least one of the rows are short image sensor elements which are smaller in length than the image sensor elements of the two-dimensional array, and wherein the image sensor elements in one of the rows are reference image sensor elements which are equal in length to the image sensor elements of the two-dimensional array.

15. The method of claim 14 further comprising controlling either the velocity of the target moving in the first direction or the clock rate of shifting the charge packets along the image sensor elements of the two-dimensional array in the first direction, wherein no adjustment is made if the row of reference image sensor elements have the sharpest detected image elements, wherein the velocity of the target is increased or the clock rate is decreased if the row of short image sensor elements have the sharpest detected image elements, and wherein the velocity of the target is decreased or the clock rate is increased if the row of long image sensor elements have the sharpest detected image elements.

16. The method of claim 15 wherein adjusting the velocity of the target or clock rate comprises interpolating or extrapolating the sharpness of the detected image elements by the plurality of rows of image sensor elements based on differences in lengths of the sensor elements among the plurality of rows.

17. The method of claim 13 wherein the two-dimensional array of image sensor elements comprises a TDI imaging CCD array, and wherein the plurality of rows of image sensor elements each comprise a TDI shift register.

18. An imaging apparatus comprising:
- a CCD array of image sensor elements being configured to generate charge packets from a first set of image elements of a target projected on the image sensor elements of the CCD array and moving in a first direction with respect to the CCD array of image sensor elements, and to shift the charge packets along the image sensor elements in the first direction according to a clock rate;
- a plurality of CCD shift registers each including a plurality of image sensor elements extending in the first direction to generate charge packets from a second set of image elements of the target projected on the image sensor elements of the CCD shift registers and moving in the first direction, and to shift the charge packets along the image sensor elements in the first direction according to the clock rate, the plurality of CCD shift registers having the same number of image sensor elements, each CCD shift register having image sensor elements that are different in length from the image sensor elements of the other CCD shift registers;
- means for measuring the sharpness of detected image elements sensed by the image sensor elements in each CCD shift register; and
- a controller configured to control either the velocity of the target moving in the first direction or the clock rate of shifting the charge packets along the image sensor elements of the CCD array in the first direction based on the measured sharpness of the detected image elements of the CCD shift registers.

19. The imaging apparatus of claim 18 wherein at least three CCD shift registers are spaced from each other, wherein the image sensor elements in at least one of the CCD shift registers are long image sensor elements which are greater in length than the image sensor elements of the two-dimensional array, wherein the image sensor elements in at least one of the CCD shift registers are short image sensor elements which are smaller in length than the image sensor elements of the two-dimensional array, and wherein the image sensor elements in one of the CCD shift registers are reference image sensor elements which are equal in length to the image sensor elements of the two-dimensional array.

20. The imaging apparatus of claim 19 wherein the controller makes no adjustment if the row of reference image sensor elements have the sharpest detected image elements, wherein the controller increases the velocity of the target or decreases the clock rate if the row of short image sensor elements have the sharpest detected image elements, and wherein the controller decreases the velocity of the target or increases the clock rate if the row of long image sensor elements have the sharpest detected image elements.

* * * * *